July 7, 1964  R. A. FREIBERG  3,140,427
SERVO VALVE DRIVER
Filed April 7, 1961  2 Sheets-Sheet 1

ROBERT A. FREIBERG
INVENTOR

By W. O. Quisenberry
Claude Funkhouser
ATTORNEYS

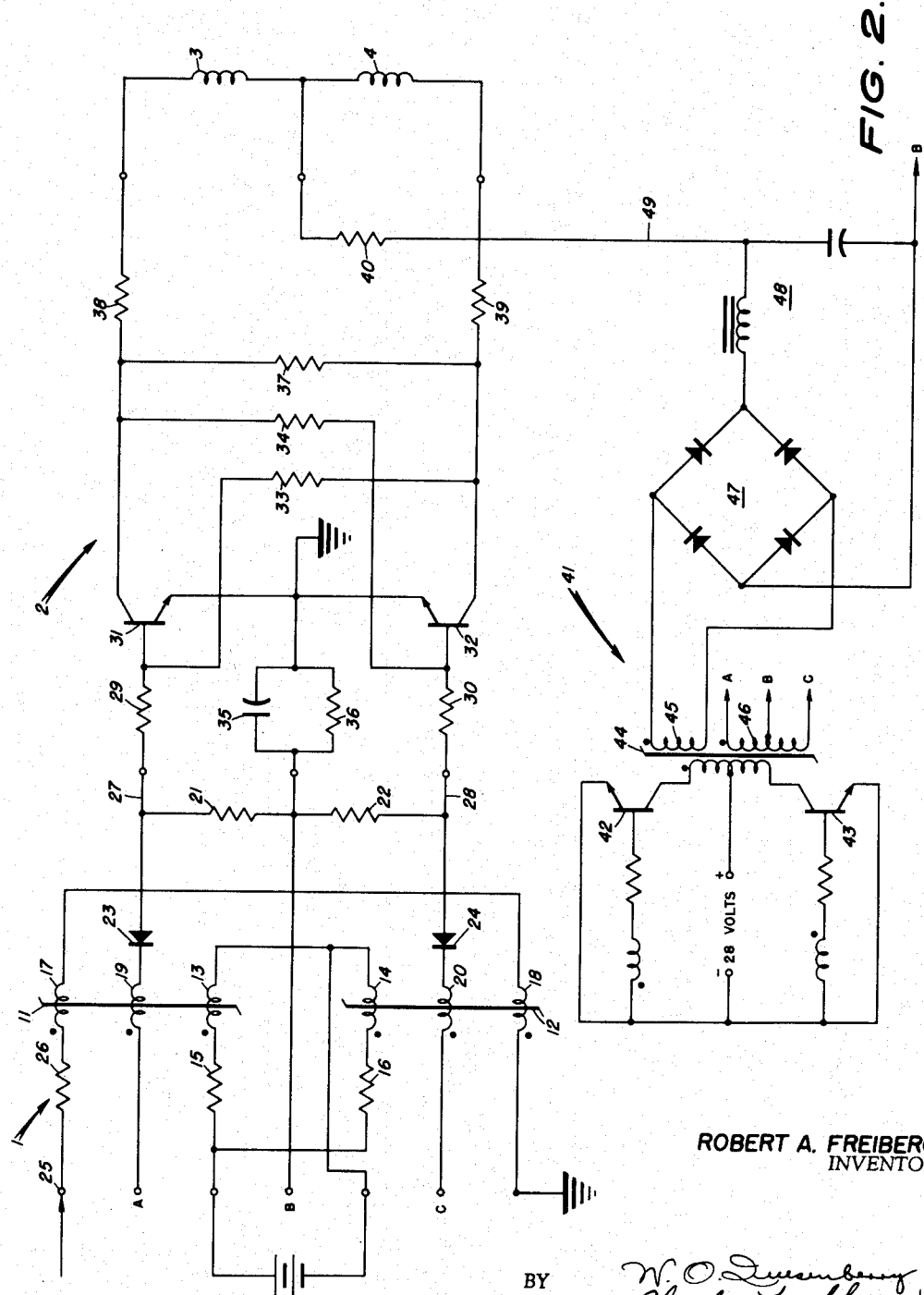

United States Patent Office 3,140,427
Patented July 7, 1964

3,140,427
SERVO VALVE DRIVER
Robert A. Freiberg, Silver Spring, Md., assignor to the United States of America as represented by the Secretary of the Navy
Filed Apr. 7, 1961, Ser. No. 101,609
8 Claims. (Cl. 317—148.5)

The present invention relates in general to hydraulic servomechanisms and more specifically to a magnetic control circuit and transistor driver for a hydraulic transfer valve of the type used in guided missile control systems.

As a result of the power and response requirements of present day missiles much use has been made of hydraulic control surface servo systems. One of the first attempts at use of this scheme for missile control involved the use of a linear hydraulic servomechanism which provided proportional control of the output member by an input control signal. This linear system proved to have many shortcomings including susceptibility to fouling and poor response at low signal levels.

In an attempt to provide a simpler and more dependable system, the invention proposes a bistable servo loop in which the hydraulic valve is acceleration switched by a magnetic control circuit and bistable transistor driver.

The primary object of the invention is to provide a control circuit for a hydraulic transfer valve which permits accurate variation of the conduction time of the individual torque-motor coils on the valve.

Another object of the invention is to provide a control circuit for a hydraulic transfer valve which provides for interdependent inverse regulation of the conduction time of the valve control coils.

Still another object of the invention is to provide a binary control circuit for a hydraulic transfer valve in which control is accomplished through regulation of the saturation time of a pair of saturable cores.

A further object of the invention is to provide a binary control circuit for a hydraulic transfer valve which has the inherent ability to compensate for parameter variations within itself.

Still a further object of the invention is to provide a binary control circuit for a hydraulic transfer valve which is characterized by excellent frequency and transient response, high resolution, and good small signal response properties.

Other objects and many of the attendant advantages of this invention will be readily appreciated as the same becomes better understood by reference to the following detailed description when considered in connection with the accompanying drawings, wherein:

FIG. 2 is a schematic diagram of the circuit comprising the invention;

Figure 1:
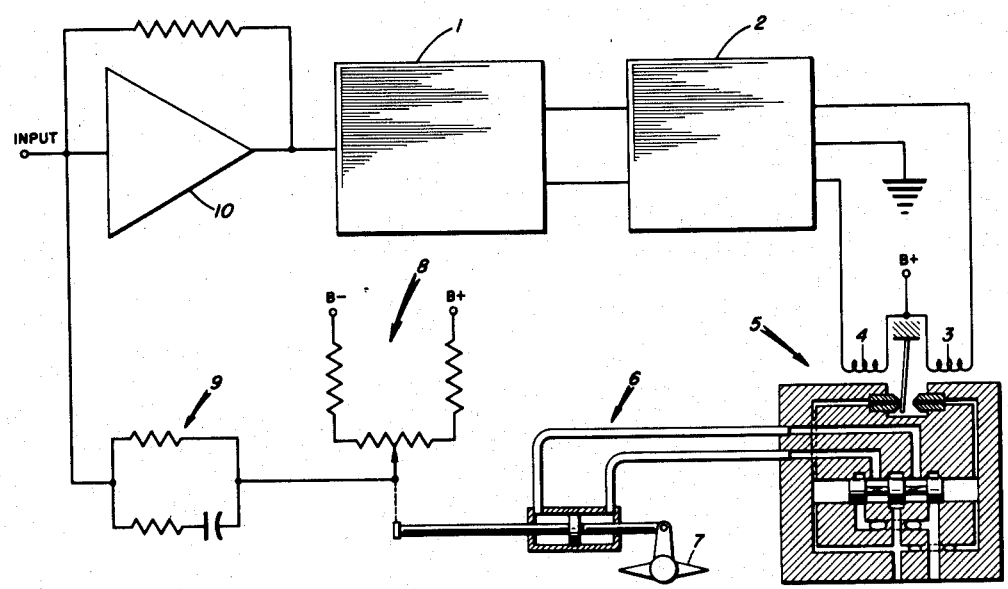
FIG. 1 is a schematic diagram of the missile servo-loop embodying the invention.

Referring now to the drawings more specifically, and more particularly to FIG. 1 thereof, the missile servo-loop embodying the invention consists of a magnetic control circuit 1 which controls and times operation of transistor driver 2. The driver 2 operates in a bistable manner to supply current to the control coils 3 and 4 of the hydraulic transfer valve 5.

The actuator 6 receives pressure from the valve 5 in varying amounts and thereby drives missile control surface 7. A feedback signal is derived from operation of potentiometer 8 by the actuator 6. This signal is returned via feedback circuit 9 and operational amplifier 10 to the magnetic control circuit 1 to complete the servo loop.

The invention may be more specifically described with reference to FIGS. 2 and 3. In FIG. 2 the magnetic control circuit designated generally at 1 consists of two separate and distinct magnetic cores 11 and 12. A bias field is applied to these cores through a pair of parallel connected bias windings 13 and 14. Resistors 15 and 16 are respectively connected in the branches of the bias circuit to regulate the current therein. By connecting similarly wound coils in parallel a bias field of a similar sense and direction will be induced in each core. A direct current bias of 28 v. is applied to this circuit.

Cores 11 and 12 also contain a pair of signal windings 17 and 18, respectively, which are connected in series relation. These coils are wound in the same sense and being serially connected will induce a field of opposite sense and direction in each core.

The necessary excitation field is applied to core 11 through winding 19 and to core 12 through winding 20. These coils are set up for balanced operation by return connection through resistors 21 and 22 to common line B from the power supply. Rectifiers 23 and 24, connected to coils 19 and 20, respectively, maintain unidirectional current flow in each coil.

The output of the magnetic control circuit 1 is connected by way of lines 27 and 28 through resistors 29 and 30 to the bases of switching transistors 31 and 32 in the transistor driver section 2. This section comprises a standard twin-transistor bistable flip-flop circuit comprising collector-to-base cross coupling resistances 33 and 34 and having a constant bias provided by capacitor 35 and resistance 36. Resistance 37 is connected between collectors to prevent ringing. The output of the driver contains the valve control windings 3 and 4. These windings are connected to the collectors of switching transistors 31 and 32 through resistances 38 and 39 and have a center tap connection through load resistor 40 to the D.C. output of the power supply 41 and thence to ground. Under the conditions of instantaneous and complete switching, only one of the load coils will be energized at any given time. In this way the required separate and distinct control of each of the valve control windings is possible.

The power supply for the magnetic control circuit 1 and the transistor driver 2 comprises a standard D.C. to A.C. converter designated generally at 41. The converter is a magnetically coupled multi-vibrator type having a pair of transistors 42 and 43 and a saturating transformer 44. The converter supplies a square wave 200 cycle excitation for the magnetic control circuit 1 through secondary winding 46 of transformer 44. In addition secondary winding 45 supplies a square wave voltage which is rectified in bridge rectifier 47, filtered by the inductance capacitance combination 48 and supplied via line 49 to transistor driver 2. The power input to the converter is a D.C. source such as a battery.

Figure 3:
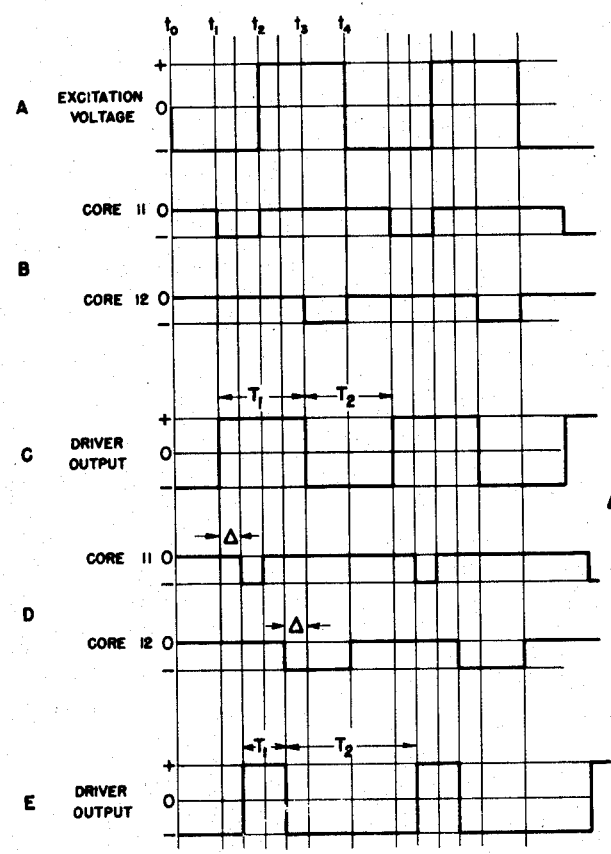
FIG. 3 is a graphical representation, to a common time base, of approximate wave forms which exist in various portions of the circuit of FIG. 2.

The operation of the invention can be most easily explained in conjunction with the wave forms of FIG. 3. The transistor switches 31 and 32 are connected to operate in the bistable mode, i.e., only one of the transistors will conduct at a time and this condition can be changed only through application of a pulse of the proper polarity to a particular one of the transistors. In the circuit illustrated in FIG. 2 the operating state or condition of the transistor driver 2 can only be changed by application of a negative pulse to the base of the transistor which is in the conducting state. As a result the operating time for each half of the driver section 2 can be selected through proper regulation of the input pulses to transistors 31 and 32. This very important regulation is carried out by the magnetic control circuit 1.

The 200 c.p.s. square wave excitation voltage applied to the windings 19 and 20 is shown as curve A of FIG. 3. Because of the action of rectifiers 23 and 24 in the excitation circuit only the negative half of the square wave will pass through winding 19 and only the positive half of this voltage will pass through winding 20. The windings 19 and 20 are so arranged on each core that the bias field and the excitation field will be in opposition to each other within each core. With no signal input each core is biased to saturate in one-fourth of the period of the excitation voltage applied to it. Thus in B of FIG. 3 core 11 is shown to saturate at time $t_1$ and core 12 is shown to saturate at time $t_3$. Since the saturation time for each core is the same, the negative square wave output from each half of the magnetic control circuit 1 to the transistor driver 2 will be of equal time duration. The output pulses from the control circuit will thus be equally spaced and will switch each half of the transistor driver 2 for equal periods of conduction as shown at C in FIG. 3. For the "no signal" condition $T_1$ will be equal to $T_2$.

The primary object of the invention is to provide a means for varying the excitation time of one output winding with respect to the excitation time of the other output winding without changing the total period of excitation of the two windings. This is achieved by application of a D.C. signal voltage of the proper magnitude to terminal 25 in control circuit 1. This signal will pass through resistance 26, winding 17 and winding 18 to ground.

During time period $t_0$–$t_2$, as shown in FIG. 3, core 11 will be energized by the excitation, bias and signal voltages in such a manner that the signal field and the excitation field will be in opposition in the core. The addition of the signal voltage to the core 11 will increase the saturation time of the core such that it will saturate a time amount $\Delta$ after $t_1$. During this period of time no excitation voltage is flowing in coil 20 so core 12 will not saturate.

During the time period $t_2$–$t_4$ as shown in FIG. 3 core 12 will be energized by the excitation, bias and signal voltages. However, in this core the field due to the signal voltage will be negative since the current through coil 18 will be opposite in direction to the current passing through coil 14. As a result the saturation time of core 12 will be reduced and the saturation of the core will be advanced by a time amount $\Delta$.

The time differential $\Delta$ may be varied between zero and a quarter of a cycle through variation of the magnitude of the signal voltage. Since this time differential is added and subtracted from portions of the same total time period, the total time period of the driver output will be a constant. This is shown in curve E of FIG. 3 which represents the driver output voltage.

The combination as described has many advantages in addition to rapid and efficient operation. For one thing, the cores of the magnetic control circuit need not be precisely matched since the only effect of an unbalance is to introduce a bias in the circuit. No wandering of the valve would result from this condition. Another advantage is derived from the use of separate cores. This particular configuration allows for complete separation of the two control signals to the driver section.

Obviously, many modifications and variations of the present invention are possible in the light of the above teachings. It is therefore to be understood that within the scope of the appended claims the invention may be practiced otherwise than as specifically described.

What is claimed is:

1. An acceleration switching control circuit comprising a pair of load windings, a direct current power source, a bistable flip-flop circuit connected to said power source and said load windings for selectively transferring power to each of said load windings, a source of square wave excitation voltage and magnetic means for varying the conduction time of one half of said bistable flip-flop with respect to the other half while maintaining a constant total period of operation corresponding to the period of said excitation voltage.

2. An acceleration switching control circuit as described in claim 1, wherein said means comprises a magnetic control circuit having a pair of cores which are so biased by the applied signal as to cause variation in the saturation time of the cores with variations in signal amplitude.

3. An acceleration switching control circuit as defined by 2, wherein said load windings comprise the torque-motor coils of a hydraulic control valve.

4. An acceleration switching control circuit comprising a pair of load windings, a direct current power source, a bistable switching circuit connected to said power source and said load windings for selectively transferring power to each of said load windings, a pair of saturable magnetic cores each having a signal winding, an excitation winding and a bias winding, a source of square wave excitation voltage connected in push-pull relationship to said excitation windings so that said excitation windings are alternately energized by said excitation source, said excitation windings being connected to said bistable switching circuit so as to control the alternate application of power to said load windings, and control means associated with each of said cores for varying the saturation time of one of said cores with respect to the other core while maintaining a constant total period of operation of said circuit corresponding to the period of said excitation voltage.

5. An acceleration switching control circuit as defined by claim 4 wherein said load windings comprise the torque-motor coils of a hydraulic control valve.

6. An acceleration switching control circuit as defined in claim 4, wherein said control means comprises a pair of signal coils connected in series and arranged on said cores so that for a given control signal polarity the saturation time of one core will increase and the saturation time of the other core will decrease by the same factor.

7. An acceleration switchin control circuit including a pair of load windings, a direct current power source, bistable switching means, comprising a pair of transistors having collector-to-base cross coupling, connected to said power source and said load windings for selectively transferring power to each of said load windings, a pair of saturable magnetic cores each having an excitation winding and a bias winding, a source of square wave excitation voltage connected in push-pull relationship to said excitation windings so that said excitation windings are alternately energized by said excitation source, said excitation windings being connected to said bistable switching means so as to control the continuous alternate application of power to said load windings, and control means associated with each of said cores for varying the saturation time of one of said cores with respect to the other core while maintaining a constant total period of operation of said circuit corresponding to the period of said excitation voltage.

8. An acceleration switching control circuit as defined in claim 7, wherein said control means includes a pair of signal coils connected in series and arranged on said cores so that for a given control signal polarity the saturation time of one core will increase and the saturation time of the other core will decrease by the same factor.

References Cited in the file of this patent

UNITED STATES PATENTS 2,809,303    Collins _____ Oct. 8, 1957
2,985,774    Carbone et al. _____ May 23, 1961

OTHER REFERENCES

"Magnetic Subtraction, Saturation-Reactor Circuit," paragraph 26.2, pages 431–432, in Magnetic Amplifiers (Storm), published by Wiley, 1955.